No. 732,724. PATENTED JULY 7, 1903.
E. F. EDGAR.
SUPERHEATER.
APPLICATION FILED NOV. 12, 1902.
NO MODEL. 2 SHEETS—SHEET 1.
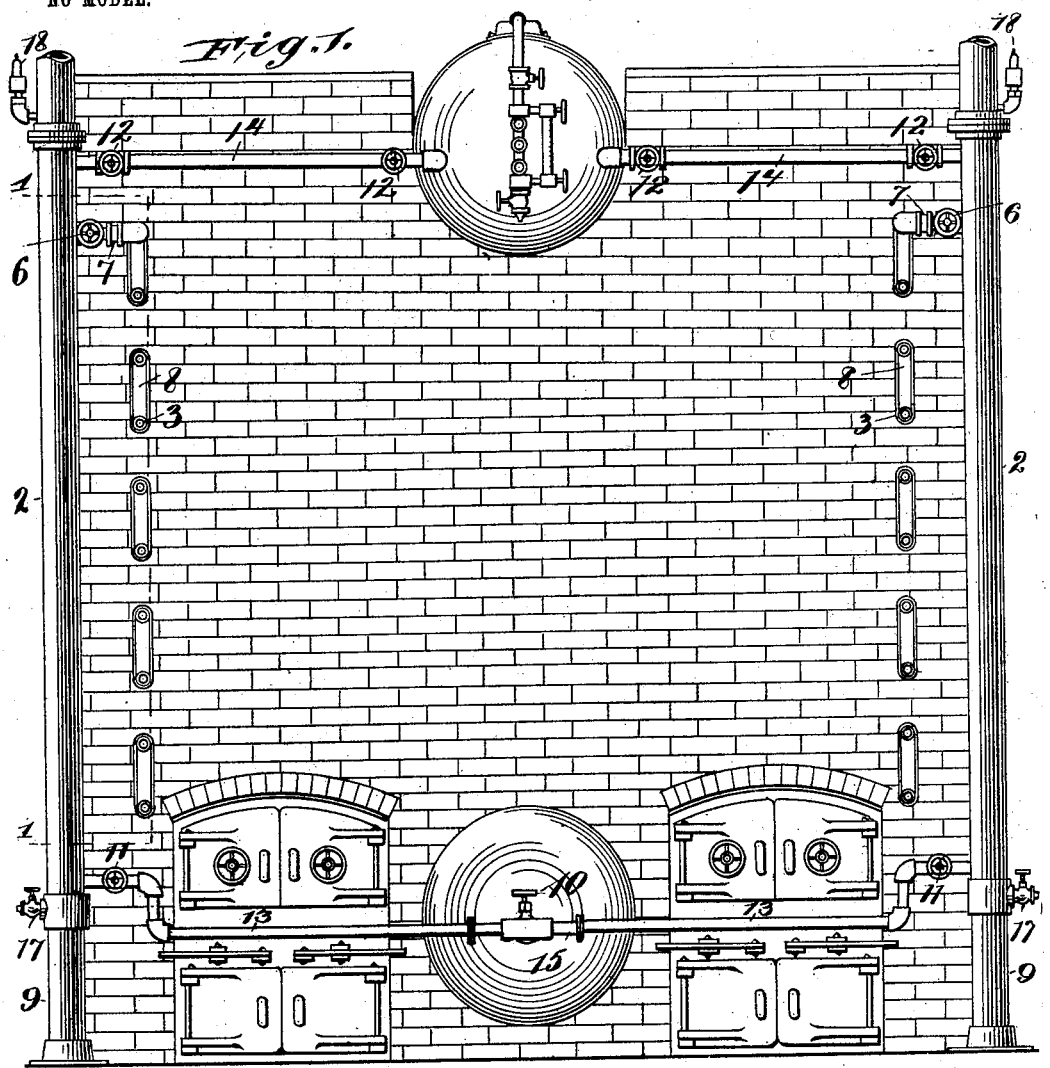
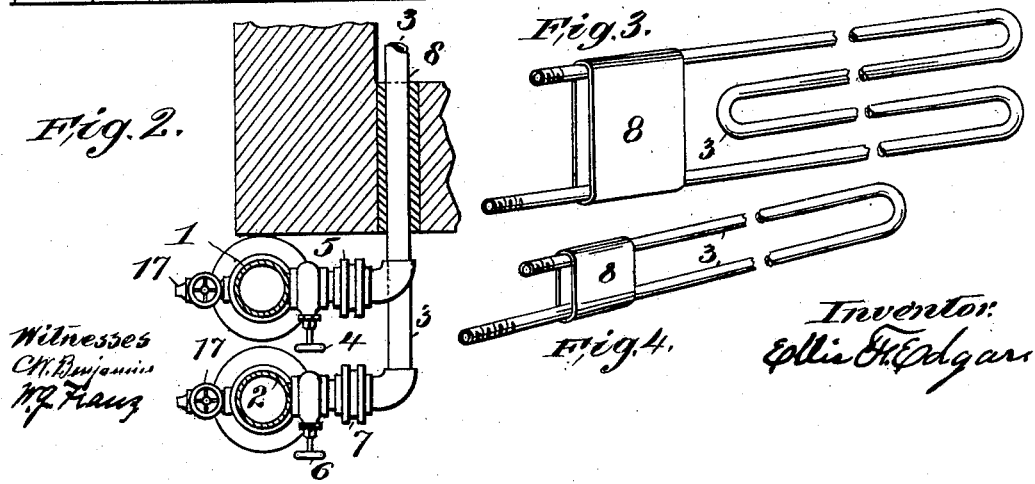
Witnesses
C. W. Benjamin
W. F. Franz
Inventor
Ellis F. Edgar

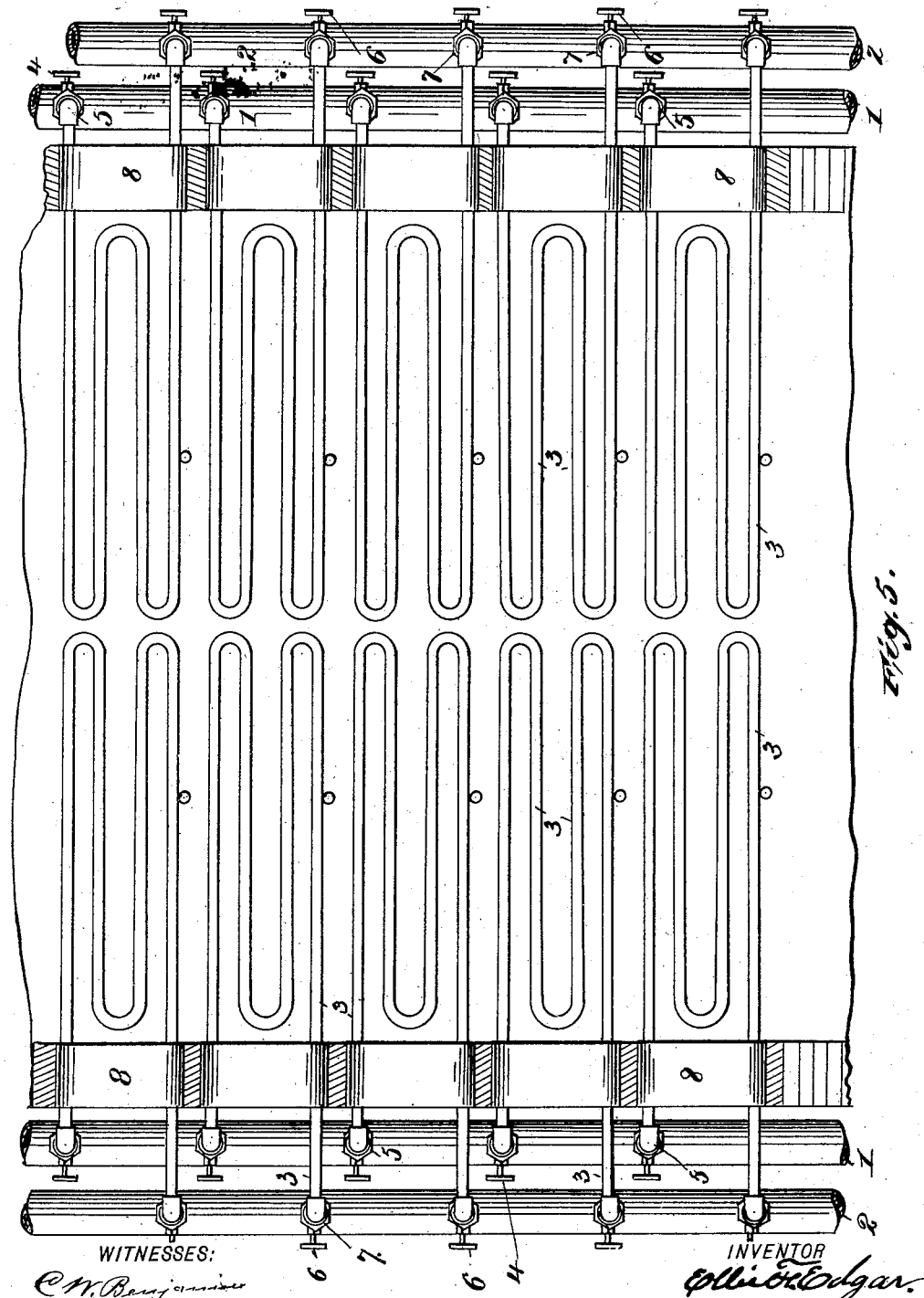

No. 732,724. Patented July 7, 1903.

UNITED STATES PATENT OFFICE.

ELLIS F. EDGAR, OF WOODBRIDGE, NEW JERSEY.

SUPERHEATER.

SPECIFICATION forming part of Letters Patent No. 732,724, dated July 7, 1903.

Application filed November 12, 1902. Serial No. 130,952. (No model.)

*To all whom it may concern:*

Be it known that I, ELLIS F. EDGAR, a citizen of the United States, and a resident of Woodbridge, in the county of Middlesex and State of New Jersey, have invented certain new and useful Improvements in Superheaters, of which the following is a specification.

Figure 1 is a front elevation view. Fig. 2 is a plan view of one receiving-pipe and one discharge-pipe connected to the ends of a loop. Fig. 3 is a perspective view of a four-legged loop and a thimble. Fig. 4 is a perspective view of a two-legged loop and thimble. Fig. 5 is a side elevation at lines 1 1 in Fig. 1.

Fig. 1 is a front elevation of a boiler equipped with my improved superheater. In this view I show receiving-pipes 2. I cannot show discharge-pipes 1 in this view, as they are directly behind receiving-pipes 2, so I show an enlarged detail plan view in Fig. 2 of receiving-pipe 2 and a discharge-pipe 1, showing how they are located and connected to a superheating-loop 3, receiving-pipe 2 being connected to the lower leg of the loop, which is the longest, and discharge-pipe 1 connected to the upper leg of the loop, which is the shortest leg. Of course in the four-legged loop shown in Fig. 3 the two center legs are the shortest legs of the loop; but they have no ends for connection, so I think the description is sufficient, as the drawing is clear. The ends of the loop are connected to the receiving-pipe 1 and discharge-pipe 2 by means of a union or flange connection 5 and 7. Near the top of each receiving-pipe and discharge-pipe I place a safety-valve 18. Pipes 13 and 14 are to connect the lower and upper drums of the boiler-section to receiving-pipes 2, substantially as shown in Fig. 1. At the lower end of each receiving and discharge pipe I place a valve or stop-cock 17 for drawing off condensation. Pipes 9 are supports for receiving and discharge pipes. Thimbles 8 are built in the brick wall for the reception of the superheating-loops 3. I would usually construct with one receiving-pipe and one discharge-pipe on each side of the boiler and usually on each end of the boiler, as shown in Fig. 5. I prefer so to construct; but I might construct only on one side, and I might construct on both sides and only on one end, as shown in Fig. 1. I think this description, with the drawings, is sufficient to enable any one familiar with the art to construct.

Where a high degree of superheat is required, the four-legged superheating-loop shown in Fig. 3 is preferable to the two-legged loop shown in Fig. 4. The superheating-loops are extended into the furnace through thimbles 8 in a horizontal position, as shown in Fig. 5, for reasons herein and hereinafter given in the description of operation.

Operation: Valves 6 and 4 are opened to any desired area, according to the temperature of steam wished for, saturated steam flowing from receiving-pipe 2 through valves 6 into lower leg of superheating-loop 3, passing out of upper leg through valve 4 into discharge-pipe 1. The saturated steam being the heaviest should always enter the lower leg of a superheating-loop, and the loops should be horizontal, as the steam in being heated is so much lighter than the saturated steam. If the loop is not horizontal and the saturated steam enters the top of the loop, as soon as it begins to heat it will crowd back through the saturated steam toward the boiler, raising the temperature of the saturated steam with the heat it has obtained, raising the pressure in the boiler before the desired temperature can be obtained in the discharge-pipe. By the construction of the superheating-loops here shown the saturated steam enters the lower leg, and as it receives the heat it will rise rapidly on through the loop to the upper leg and into the discharge-pipe 1 with the desired temperature, regulated by valves 6 and 4. In case a superheating-loop should burn out or otherwise need to be replaced by closing valves 6 and 4 and disconnecting union or flange 7 and 5 the injured loop may be taken out and replaced by another one without stopping the action of any of the other loops. The space in the thimble between the ends of the loops may be filled with asbestos or other non-combustible material, which must be of material easy to remove. It is necessary to place something here to prevent cold air from entering the furnace. In case the boiler is not desired to deliver superheated steam the loops can be removed in a very short time without stopping the operation of the boiler; but some prefer to flood the loops instead of removing them, as in flooding they can increase the horse-power of the boiler. In that case the construction of these superheating-loops becomes of great advantage, as one may open valves 6 and 4 wide and valves 10 and 11 and 12, and the water from pipe 13 will flow into receiving-pipes 2 and into lower leg of superheating-loop 3, through said loop into discharge-pipe 1 without hammering in the superheating-loops. For reasons already described, due to construction of the loop, the steam and water from the loops 3 rise in discharge-pipe 1 to the water-level in the boiler, the water circulating back to the boiler through water-pipe 14. Discharge-pipe 1, above the water-level, should be connected to upper drum 16 to allow the steam which will separate from the water in discharge-pipe 1 at the water-level to pass to the boiler in a better manner than it would if it were forced to pass through pipe 14, which should be used for water only. By taking water out of the lower drum 15 and flooding the superheating-loops in the manner described I get a better result in keeping the superheating-tubes clean than I would if I located them near the top of the boiler and took the water at or near the surface for flooding the superheating system, as in doing so a scum which rises to the surface of the water in a boiler will soon form a scale and fill up a superheating system, where in this construction I obviate that, and, again, by this construction receiving-pipe 2 may be filled up to the water-level of the boiler and valves 6 only opened a short distance sufficient to allow a very small stream to trickle into lower leg of loop 3 of such a quantity that only steam will pass from upper leg of loop 3 to discharge-pipe 1. This process I prefer to the entire flooding of the superheating-loops, and this could only be done in a practical manner in a horizontal loop, as here described and for reasons herein given. In flooding the superheating system the tops of both receiving-pipes 2 and discharge-pipes 1 should always have an open connection with the top of upper drum 16. Pipes 14 are not absolutely necessary; but some would prefer them, and they do no harm, as valves 12 can be closed if they are not desired to be used.

In inventing this superheating device I had in view several objects—namely, large heating-surface, which is obtained by my long vertical receiving and discharge pipes extending the height of the boiler connected by the superheating-loops, which practically extend the height of the boiler, which enables me to utilize a large number of loops; high degree of superheat obtained by great number of loops and adapted for entering the hottest part of the furnace; ease of replacing superheating-loops; desired temperature of superheat in discharge-pipe without increasing temperature of steam in boiler by superheated steam crowding back to boiler; practical manner of flooding superheating system by trickling water into the superheating system without hammering, and safety-valves so located as to obviate the blowing up a superheating system by carelessly closing valves between the superheating systems and relief.

Having described my invention, what I claim as new, and desire to secure by Letters Patent, is—

1. In a superheating device a vertical receiving-pipe and a vertical discharge-pipe located near each other and connected by individually-removable horizontal superheating-loops, each loop being connected to said receiving and discharge pipes separately by means of union or flange connections and having valves between said receiving and discharge pipes and union or flange connections, the loops being arranged one above another and extending in a furnace means for admitting water to one of the legs of each loop and safety-valves on the receiving or discharge pipes.

2. In a superheating device a vertical receiving-pipe and a vertical discharge-pipe located near each other and connected by individually-removable horizontal superheating-loops each loop being connected to said receiving and discharge pipes separately by means of union or flange connections and having valves between said receiving and discharge pipes and union or flange connections, the loops being arranged one above another and extending in a furnace, means for admitting water to one of the legs of each loop and safety-valves on the receiving or discharge pipes.

3. In a superheating device a vertical receiving-pipe and a vertical discharge-pipe connected by a series of horizontal superheating-loops located one above another and each loop composed of two or more legs one leg above another, the lower leg connected to the receiving-pipe and the upper leg connected to the discharge-pipe substantially as set forth.

4. In a superheating device a vertical receiving-pipe and a vertical discharge-pipe connected by a series of horizontal superheating-loops located one above another and each loop composed of two or more legs one leg above another the lower leg connected to the receiving-pipe and the upper leg connected to the discharge-pipe, said loops being connected to said receiving and discharge pipes by union or flange connections and valves located between said receiving and discharge pipes and said union or flange connections substantially as set forth.

Signed at New York, in the county of New York and State of New York, this 11th day of November, A. D. 1902.

ELLIS F. EDGAR.

Witnesses:
W. G. FRANZ,
C. B. GLICK.